US012581294B2

(12) United States Patent
Farris et al.

(10) Patent No.: US 12,581,294 B2
(45) Date of Patent: Mar. 17, 2026

(54) MOBILE DEVICE DUAL AUTHENTICATION

(71) Applicant: Bank of America Corporation, Charlotte, NC (US)

(72) Inventors: Taylor Farris, Hoboken, NJ (US); Jennifer Sanctis, Charlotte, NC (US); Jesse James Godley, Charlotte, NC (US); Trish Gillis, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 316 days.

(21) Appl. No.: 18/220,413

(22) Filed: Jul. 11, 2023

(65) Prior Publication Data

US 2025/0024255 A1     Jan. 16, 2025

(51) Int. Cl.
| | |
|---|---|
| *H04W 12/02* | (2009.01) |
| *G06F 21/32* | (2013.01) |
| *H04W 12/03* | (2021.01) |
| *H04W 12/06* | (2021.01) |
| *H04W 12/08* | (2021.01) |
| *H04W 12/12* | (2021.01) |
| *H04W 12/61* | (2021.01) |

(52) U.S. Cl.
CPC ............ *H04W 12/06* (2013.01); *G06F 21/32* (2013.01); *H04W 12/61* (2021.01)

(58) Field of Classification Search
CPC ........ H04W 12/06; H04W 12/61; G06F 21/32

USPC ......................................................... 455/410
See application file for complete search history.

(56) References Cited

U.S. PATENT DOCUMENTS

| | | | | |
|---|---|---|---|---|
| 9,471,921 | B1* | 10/2016 | Dalit | G06Q 20/22 |
| 2021/0281572 | A1* | 9/2021 | Fernandez-Spadaro | |
| | | | | H04L 63/083 |
| 2021/0357486 | A1* | 11/2021 | Tozzi | G06Q 20/3674 |
| 2023/0057574 | A1* | 2/2023 | Burgess | H04L 63/102 |
| 2023/0359717 | A1* | 11/2023 | Nakazaki | A61B 5/107 |
| 2024/0202294 | A1* | 6/2024 | Yogerst | G06V 10/82 |

OTHER PUBLICATIONS

IP.com search history (Year: 2025).*

* cited by examiner

*Primary Examiner* — Moustapha Diaby
(74) *Attorney, Agent, or Firm* — Weiss & Arons LLP

(57) ABSTRACT

Apparatus and methods for dual authentication through a mobile device are provided. The apparatus and methods may include a device with two or more authentication sensors and a dual-authentication engine. When a request to authenticate a user is received, the user may use two or more of the authentication sensors within a short pre-determined time period. The results of the user's use of the sensors may be analyzed by the dual-authentication engine. When the results satisfy one or more authentication criteria, the dual-authentication engine may authenticate the user.

18 Claims, 6 Drawing Sheets

Dual Authenticate By
Taking:

1) Picture of you

- and -

2) Picture of ID card

MOBILE DEVICE DUAL AUTHENTICATION

FIELD OF TECHNOLOGY

Aspects of the disclosure relate to providing apparatus and methods for dual authentication of a user with a mobile device.

BACKGROUND OF THE DISCLOSURE

Smartphones are ubiquitous today. Other smart mobile devices, such as smartwatches, fitness trackers, smartcards, tablets, and smart glasses, may integrate some of the functions of smartphones in different and various form factors. These other smart mobile devices are also becoming more ubiquitous, even if they have not achieved the same level of popularity as smartphones.

Many software applications (smartphone app-based as well as browser/desktop app-based) require a user to login and authenticate before use, as a single-factor authentication (e.g., a username and password). Other instances of authentication may be required, for example, to enter a building, finalize a financial transaction, or sign a legally binding document (i.e., notary or similar).

Standard authentication methods, such as username and password, one-time password, PIN, biometric scanning may be susceptible to malicious activity, or may not be secure. Additional and new authentication methods and apparatus may be needed to prevent or reduce malicious activity.

However, some options may require multiple extra steps by the user, taking extra time as well as causing discontent and annoyance among users, which may cause the user(s) to cancel activities or disrupt the user's activities. Providing methods and apparatus for single device dual authentication may reduce the number of steps for advanced and more secure authentication.

Therefore, it would be desirable for apparatus and methods to enable single device dual authentication instead of standard security and authentication methods.

SUMMARY OF THE DISCLOSURE

It is an object of this disclosure to provide apparatus and methods for dual authentication through mobile devices.

An apparatus for dual authentication is provided. The apparatus may include a smart mobile device. The smart mobile device may include one or more first direction-facing cameras, one or more second direction-facing cameras, a communication link, a processor, and a non-transitory memory.

The non-transitory memory may be configured to store at least an operating system, and a dual-authentication engine that runs on the processor.

The dual-authentication engine may be configured to receive a request to authenticate a user, operate the one or more first direction-facing cameras, and operate the one or more second direction-facing cameras.

When the dual-authentication engine receives the request to authenticate the user, the dual-authentication engine may request the user use one or more of the one or more first direction-facing cameras and simultaneously use one or more of the one or more second direction-facing cameras.

The engine may receive one or more first pictures taken by the one or more of the one or more first direction-facing cameras and one or more second pictures taken by the one or more of the one or more second direction-facing cameras.

The engine may analyze every received picture. When every received picture satisfies one or more authentication criteria, the dual-authentication engine may authenticate the user.

In an embodiment, the smart mobile device may be a smartwatch.

In an embodiment, the smart mobile device may be a smartphone.

In an embodiment, the first direction and the second direction are diametrically opposed. For example, a forward facing camera and a rearward facing camera on a smartphone.

In an embodiment, the smart mobile device may include a biometric scanner.

In an embodiment, the first direction and the second direction may be different. In an embodiment, the first direction and the second direction may be the same.

In an embodiment, the one or more first pictures may be of the user.

In an embodiment, the one or more second pictures may be of an identification card belonging to the user.

In an embodiment, the one or more second pictures may be of a document with a current and verifiable date, such as a current newspaper or periodical.

An apparatus for dual-authentication is provided. The apparatus may include a central server and a smart mobile device.

The central server may include a server communication link, a processor, and a non-transitory memory configured to store at least an operating system and a dual-authentication engine that runs on the processor.

The smart mobile device may belong to a user and may include a device communication link and two or more authentication sensors.

The dual-authentication engine may be configured to, inter alia, receive a request to authenticate the user from the smart mobile device and control each of the two or more authentication sensors.

When the request to authenticate the user is received by the engine, the engine may prompt the user to operate at least two of the two or more authentication sensors within a pre-determined time period.

The engine may receive results of the user's operation of the at least two of the two or more authentication sensors. The engine may analyze the results to confirm an identity of the user. When the dual-authentication engine confirms the identity of the user, the engine may authenticate the user.

In an embodiment, two of the two or more authentication sensors may be cameras.

In an embodiment, one of the two or more authentication sensors may be a biometric sensor.

In an embodiment, one of the two or more authentication sensors may be a microphone.

In an embodiment, the pre-determined time period may be three seconds. Other pre-determined time periods may also be utilized. The shorter the pre-determined time period, the more secure the dual authentication may be.

In an embodiment, at least one of the two authentication sensors may operate through a distinct method from a second authentication sensor, providing two distinct authentication methods to the user.

In an embodiment, the dual authentication engine may be configured to prompt the user to operate at least two separate authentication sensors that operate distinctly from each other.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
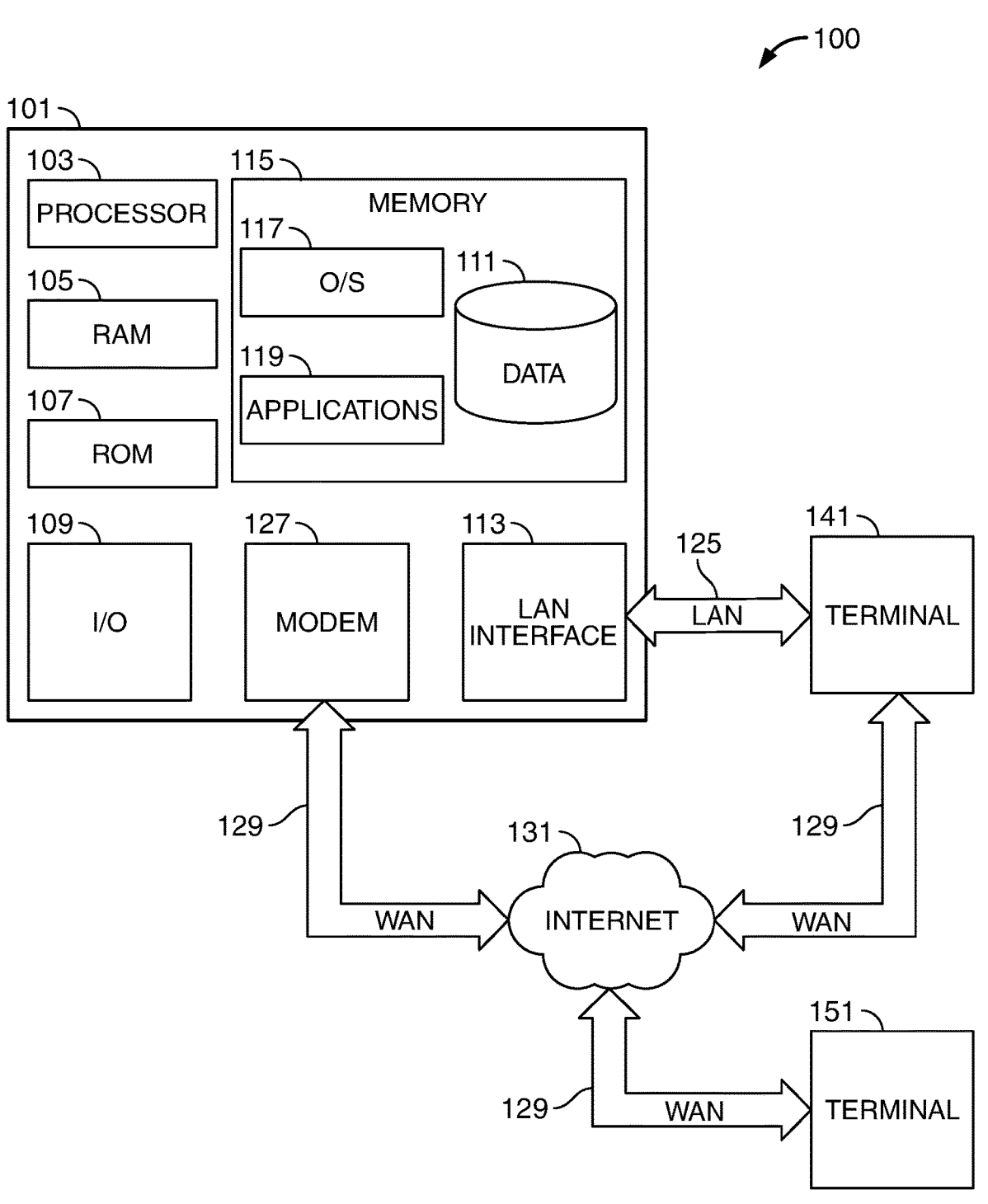
FIG. 1 shows an illustrative apparatus in accordance with principles of the disclosure.

It is an object of this disclosure to provide apparatus and methods for dual authentication through mobile devices and smart mobile devices.

An apparatus for dual authentication is provided. Dual authentication may refer to authenticating a user through two or more authentication methods or criteria at the same, or substantially the same, time.

For example, standard authentication methods may require a username and password, and then as a second, subsequent step, require a one-time passcode. This may be referred to as two-step authentication.

Dual authentication may require both steps at the same time, or at substantially the same time (e.g., within a short time period, such as two or three seconds) to authenticate the user.

As explained in this disclosure, one embodiment of dual authentication may require the user to take pictures of the user and a current, valid identification card at the same, through two separate cameras on a device. For example, using a front camera on a smartphone to take a picture of the user, and using the back camera to take a picture of the user's identification card. The identification card may be supplied by a government (such as a passport or driver's license) or may be supplied by an entity (such as an employee ID card). Different entities or applications may require different types of ID cards for various applications.

Requiring both (or more) of the authentication steps to occur at substantially the same time may increase the security, reliability, speed, and accuracy of any resulting authentication.

In another embodiment, a user may take a picture of the user while simultaneously saying a unique phrase into a microphone. Both of these (the picture and voice) may be used to authenticate the user. Other variations of dual authentication may be used as well.

The apparatus may include a mobile device. The mobile device may be a smart mobile device. Smart mobile devices may be any smart computing device that is human portable or wearable with some functionality, but generally less functionality than a full-fledged smartphone. Typical examples may include a smartphone, tablet, smartwatch, a fitness tracker, or a smartcard. Smart mobile devices may have a unique serial code or MAC address that when encrypted may be more robust than any password due to length and variety. Each smart mobile device may be registered to a particular user and the serial number or MAC address (encrypted and/or hash values) may be stored and associated with the particular user. In an embodiment, smart mobile devices may refer to wearable smart devices, such as smartwatches, fitness trackers, and smart glasses.

The mobile device may include one or more first direction-facing authentication sensors, such as cameras and microphones etc., one or more second direction-facing authentication sensors, such as cameras etc., a communication link, a processor, and a non-transitory memory.

Each sensor may face a different direction. The direction may vary as the mobile device is moved. In an embodiment, one or more sensors may be physically moved by a user manipulating the sensor.

In an embodiment, each direction may be variable. The user may vary a direction by, for example, moving a sensor, or a part of a sensor to face a particular direction.

In an embodiment, each sensor may face the same direction. For example, a mobile device (such as, e.g., a smartphone) may have a microphone and a camera both facing the same direction.

The direction(s) the various sensors face may limit or expand the possible variations of authentication for dual authentication. For example, it may be difficult to take a picture of a user and the user's identification card at the same time if both cameras face the same direction, as each camera will likely capture the same image. In this situation, the dual authentication may have to be accomplished through a camera and a microphone, or a biometric sensor (e.g., a fingerprint scanner), or some other authentication method.

For mobile devices with three or more authentication sensors (e.g., two cameras and a microphone), two may face a similar direction, while the third (and others) may face a different direction.

The non-transitory memory may be configured to store at least an operating system and a dual-authentication engine that runs on the processor, as well as other programs and applications.

The mobile device may include a processor or processors, as well as non-transitory memory. The non-transitory memory may include an operating systems as well as a dual authentication engine/program/module that runs on the processor.

In an embodiment, the non-transitory memory may include data, in a database or otherwise, to allow the dual authentication engine to authenticate a particular user. For example, certain data may be necessary for a comparison between the data received from each authentication sensor and known data of the user, to authenticate the user.

In an embodiment, this data may be encrypted.

In an embodiment, this data may be stored elsewhere, such as on a server, and the dual authentication engine may be required to communicate with the server to retrieve or compare the data to authenticate the user.

The mobile device may include a communication link, to enable communication with a server, other devices, and other computers/servers as needed. The communication link may include any necessary hardware (e.g., antennae) and software to control the link. The mobile device may utilize the communication link to communicate, over a network, with any application the user is interacting with or any application or hardware that is requesting authentication of the user. Any appropriate communication link, such as wi-fi, cellular signals (3G, 4G, LTE, 5G, etc.), bluetooth, NFC, and others, may be used.

In an embodiment, the network may be the Internet. In another embodiment, the network may be an internal intranet.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The processor(s) may control the operation of the apparatus and its components, which may include RAM, ROM, an input/output module, and other memory. The microprocessor may also execute all software running on the apparatus—e.g., the operating system and any applications such as the dual authentication engine and any security protocols. Other components commonly used for computers, such as EEPROM or Flash memory or any other suitable components, may also be part of the apparatus.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as the dual authentication engine) along with any data needed for the operation of the apparatus and to allow authentication of a user. The data may also be stored in cache memory, or any other suitable memory. Alternatively, some or all of computer executable instructions (alternatively referred to as "code") may be embodied in hardware or firmware.

An input/output ("I/O") module may include connectivity to a device screen, keyboard, monitor, or network interface through which a user may provide input. The input may include input relating to cursor movement. The input/output module may also include one or more speakers for providing audio output and a video display device, such as an LED screen and/or touchscreen, for providing textual, audio, audiovisual, and/or graphical output.

The dual-authentication engine may be configured to receive a request to authenticate a user. The request may be received from an application or program located on the mobile device (such as, e.g., a banking application). The request may be received from a program or application located elsewhere and on a different device. The request may be received from a website. The request may be received from a browser. The request may be communicated to the mobile device and the dual authentication engine through any standard communication protocol, as described in this disclosure.

The dual-authentication engine may be configured to operate the one or more first direction-facing sensors, such as cameras. The dual-authentication engine may be configured to operate the one or more second direction-facing sensors, such as cameras. Operating may include turning each sensor on or off, prompting a user to use each sensor, gathering data (sensor data, pictures, digital data, etc.) from each sensor, transmitting the data to and through various components (such as the processor, memory, and communications link), formatting data, and other operations.

The engine may operate each sensor by communicating with each sensor, turning each sensor on and off, recording data (such as e.g., a photograph, sound, biometric identifiers) through each sensor and transferring data. In an embodiment, each sensor may have its own operating system/program to operate the sensor. The dual authentication engine may interface and interact with that sensor's operating system/program to operate the sensor.

When the dual-authentication engine receives the request to authenticate the user, the dual-authentication engine may request the user use one or more of the one or more first direction-facing sensors and simultaneously use one or more of the one or more second direction-facing sensors. Simultaneously may be at the same exact time, or within a short pre-determined time limit, such as within one to five seconds. The shorter the pre-determined time limit, the better and more secure the apparatus may be. For example, the user may place the user's identification card in front of one camera and position another camera to take a picture of the user at the same time. The dual authentication engine may operate both cameras to take pictures of the ID card and the user at substantially the same time.

The engine may receive one or more first authentication data recorded by the one or more of the one or more first direction-facing sensors and one or more second authentication data recorded by the one or more of the one or more second direction-facing sensors. The authentication data may be pictures, biometric data, voice recordings, audiovisual recordings, and other authentication data.

The engine may analyze every piece of received authentication data. When every, or an amount above a predetermined threshold value, such as e.g., 70%, received authentication data picture satisfies one or more authentication criteria, the dual-authentication engine may authenticate the user. In an embodiment, the analysis may use one or more artificial intelligence/machine learning ("AI/ML") algorithms.

The amount of necessary authentication data to authenticate a user may vary. The amount of necessary data to authenticate a user may be variable. The dual authentication engine may adjust the pre-determined threshold value to authenticate the user. The dual authentication engine may use one or more artificial intelligence/machine learning ("AI/ML") algorithms to determine an appropriate threshold value to authenticate a user. One factor may be the security necessary for the particular application or website the user is attempting to authenticate into. For example, a banking application may have more stringent authentication requirements than a gaming application.

In an embodiment, the mobile device may be a smartwatch. A standard smartwatch may have a camera and a microphone to each act as an authentication sensor.

In an embodiment, the mobile device may be a smartphone. A smartphone may have numerous authentication sensors, such as multiple cameras, microphones, and other biometric sensors (such as, e.g., a fingerprint sensor).

In an embodiment, the first direction and the second direction may be diametrically opposed to face in substantially opposite directions. For example, a forward facing camera and a rearward facing camera on a smartphone.

In an embodiment, the mobile device may include a biometric scanner. Any suitable biometric sensor may be used, such as a fingerprint scanner or facial ID scanner. Biometric scanners may include facial recognition, fingerprint scanners, iris/retinal scanners, and other physical and behavioral biometric scanners. Individual smart mobile devices may have one or more biometric scanners.

In an embodiment, the first direction and the second direction may be different. In an embodiment, the first direction and the second direction may be about the same (i.e., within a few degrees of each other).

In an embodiment, the one or more second authentication data may be picture(s) of a document with a current and verifiable date, such as a current newspaper or periodical. This data may be used to verify and authenticate that the user is actually authenticating at the time of the request, and that data is not being spoofed. This may be an additional authentication and verification data point, instead of or in addition to two authentication methods.

An apparatus for dual-authentication is provided. The apparatus may include a central server and one or more smart mobile devices.

The central server may be centralized or distributed. The central server may include a server communication link, a server processor, and a server non-transitory memory configured to store at least an operating system and a dual-authentication engine that runs on the server processor.

In an embodiment, the central server may be distributed, to utilize a larger pool of computing resources and provide redundancy. Centralized servers may be easier to secure but also provide a single failure point. Distributed servers may be more robust but may provide multiple avenues for malicious actors to target.

The smart mobile device may belong to a user and may include, among other components, a device communication link and two or more authentication sensors.

The dual-authentication engine may be configured to, inter alia, receive a request to authenticate the user from the smart mobile device and control each of the two or more authentication sensors.

When the request to authenticate the user is received by the engine, the engine may prompt the user to operate at least two of the two or more authentication sensors within a pre-determined time period.

The engine may receive results, as digital data, of the user's operation of the at least two of the two or more authentication sensors. The engine may analyze the results to confirm an identity of the user. When the dual-authentication engine confirms the identity of the user, the engine may authenticate the user.

In an embodiment, two of the two or more authentication sensors may be cameras.

In an embodiment, one of the two or more authentication sensors may be a biometric sensor.

In an embodiment, one of the two or more authentication sensors may be a microphone.

In an embodiment, the pre-determined time period may be three seconds. In an embodiment, the dual-authentication engine may vary the pre-determined time period depending on a variety of factors, such as the types of sensors, authentication data available to the user, known authentication data, where the request to authenticate came from (some applications or websites may require more robust authentication than others), and other factors. In an embodiment, the dual-authentication engine may use one or more AI/ML algorithms to analyze these and other factors to determine an optimal length for the pre-determined time period.

In an embodiment, at least one of the two authentication sensors may operate through a distinct method from a second authentication sensor, providing two distinct authentication methods to the user. For example, a biometric sensor such as a fingerprint scanner, and a camera to take a picture of the user's face. Or a microphone to record the user's voice and a password.

In an embodiment, the dual authentication engine may be configured to prompt the user to operate at least two separate authentication sensors that operate distinctly from each other. For example, using a fingerprint scanner and a camera may be more robust, secure, and reliable than using two cameras.

A method for dual authentication with a smart mobile device belonging to a user is provided. The method may include the step of receiving, at a dual-authentication engine running on a server, a request to authenticate the user.

The server may be a central or distributed server. Each of the central or distributed server setups may be appropriate in various situations, as they vary in cost, security, and processing power.

The dual authentication engine may receive a request to authenticate the user from a software application or to approve a particular interaction in an application by a user already authenticated by the application. Alternatively, the request for authentication may come from a physical device, such as building security door lock.

The method may include the step of controlling each of two or more authentication sensors on a smart mobile device belonging to the user.

The method may include the step of instructing the smart mobile device to prompt the user to operate at least two of the two or more authentication sensors within a pre-determined time period.

The method may include the step of the smart mobile device prompting the user to operate at least two of the two or more authentication sensors within the pre-determined time period.

The method may include the step of receiving results of the user's operation of the at least two of the two or more authentication sensors.

The method may include the step of analyzing, at the dual-authentication engine, the results to confirm an identity of the user.

When the dual-authentication engine confirms the identity of the user, the method may include the step of authenticating the user.

In an embodiment, the dual-authentication engine may analyze the results through an application of one or more artificial intelligence/machine learning ("AI/ML") algorithms.

In an embodiment, the results may include a photograph of the user.

In an embodiment, the results may include a photograph of an identification card belonging to the user.

In an embodiment, if the dual authentication engine determines that the user has not been or cannot be authenticated, the dual authentication engine may default/revert to a standard authentication protocol(s) and method(s) and send the authentication request back to the application. In an embodiment, the authentication engine may decline authentication or authorization if the user cannot be dual-authenticated.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a device 101. Device 101 may alternatively be referred to herein as a "computing device." Elements of apparatus 100, including device 101, may be used to implement various aspects of the apparatus and methods disclosed herein. A "user" of apparatus 100 or device 101 may include other computer systems or servers, or a human.

Device 101 may have one or more processors/microprocessors 103 for controlling the operation of the device and its associated components, and may include RAM 105, ROM 107, input/output module 109, and a memory 115. The microprocessors 103 may also execute all software running on the device 101—e.g., the operating system 117 and applications 119 such as the authentication engine and security protocols. Other components commonly used for computers, such as EEPROM or Flash memory or any other suitable components, may also be part of the device 101.

The memory 115 may be comprised of any suitable permanent storage technology—e.g., a hard drive or other non-transitory memory. ROM 107 and RAM 105 may be included as all or part of memory 115. The memory 115 may store software including the operating system 117 and application(s) 119 (such as the dual authentication engine) along with any other data 111 (e.g., authentication profile(s) of a user and data regarding the user's mobile devices such as serial numbers or MAC addresses) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

In an embodiment of the device 101, the microprocessor 103 may execute the instructions in all or some of the operating system 117, any applications 119 in the memory 115, any other code necessary to perform the functions in this disclosure, and any other code embodied in hardware or firmware (not shown).

An input/output ("I/O") module 109 may include connectivity to a keyboard, monitor, microphone, or network interface through which higher hierarchal server or a user of server 101 may provide input. The input may include input relating to cursor movement. The input/output module 109 may also include one or more speakers for providing audio output and a video display device, such as an LED screen and/or touchscreen, for providing textual, audio, audiovisual, and/or graphical output (not shown).

In an embodiment, apparatus 100 may consist of multiple devices 101, along with other devices.

Apparatus 100 may be connected to other systems, computers, servers, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. The network connections depicted in FIG. 1 include a local area network (LAN) 125 and a wide area network (WAN) 129 but may also include other networks. Device 101 may include a network interface controller (not shown), which may include a modem 127 and LAN interface or adapter 113, as well as other components and adapters (not shown). When used in a LAN networking environment, device 101 is connected to LAN 125 through a LAN interface or adapter 113. When used in a WAN networking environment, device 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for invoking user functionality related to performing various tasks. In an embodiment, application program(s) 119 may be cloud-based applications. In an embodiment, application program(s) 119 may be a dual authentication engine and/or security protocols. In an embodiment, the authentication engine may use AI/ML algorithm(s). The various tasks may be related to using smart mobile devices to enable authentication and dual authentication of a user.

Device 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, smart mobile device, or any other suitable device for receiving, storing, transmitting and/or displaying relevant information. Terminal 151 and/or terminal 141 may be other devices such as remote servers. The terminals 151 and/or 141 may be computers where the user is interacting with the application that is being monitored by apparatus 100.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, server computers, hand-held or laptop devices, tablets, mobile phones, smart phones, smart mobile devices, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
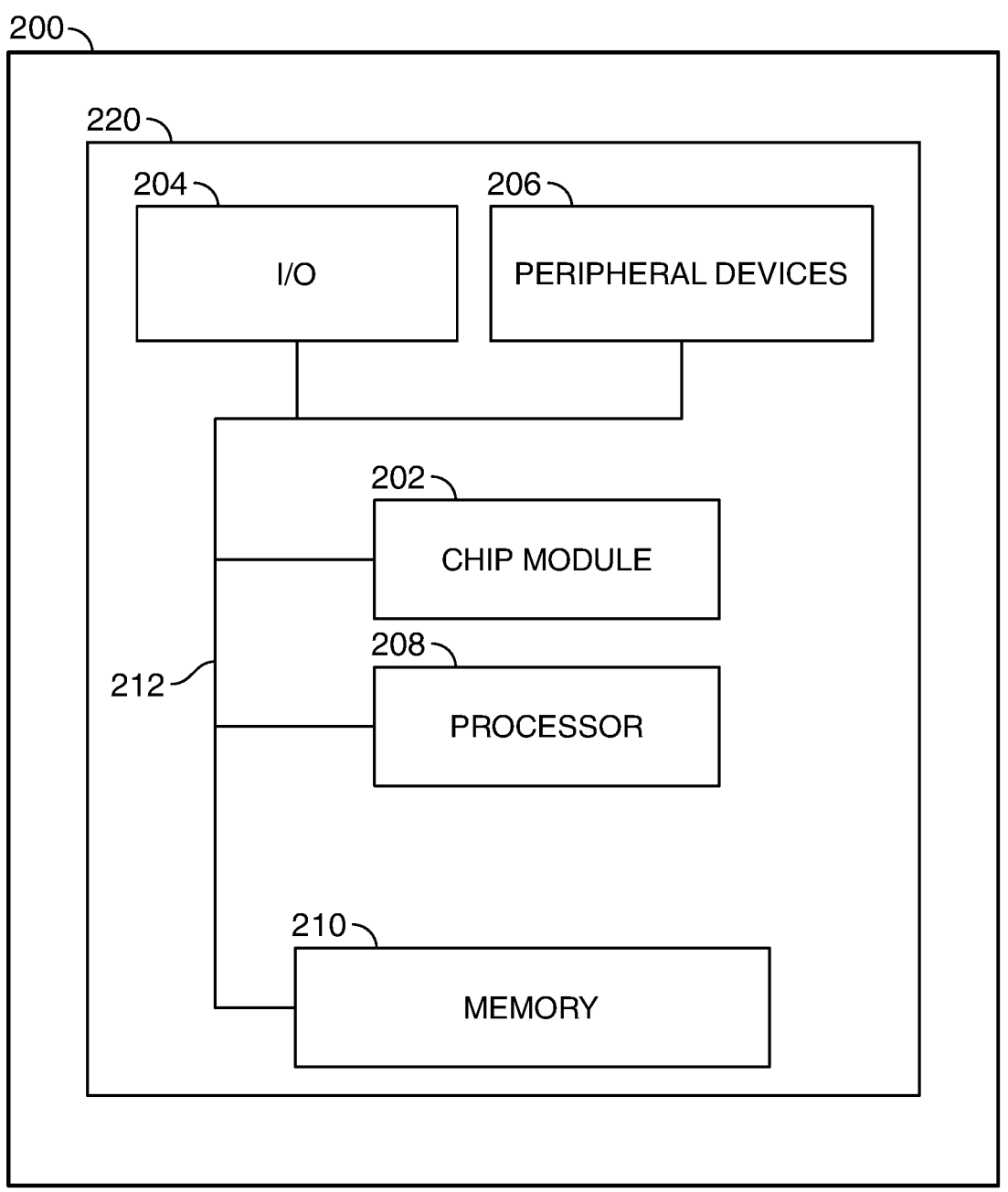
FIG. 2 shows an illustrative apparatus in accordance with principles of the disclosure.

FIG. 2 shows illustrative apparatus 200 that may be configured in accordance with the principles of the disclosure. Apparatus 200 may be a smart mobile device or server with various peripheral devices 206. Apparatus 200 may include one or more features of the apparatus shown in FIGS. 1, 3, and 4. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an LED screen, a touchscreen or any other suitable media or devices; peripheral devices 206, which may include hands-free smart mobile devices; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3B:
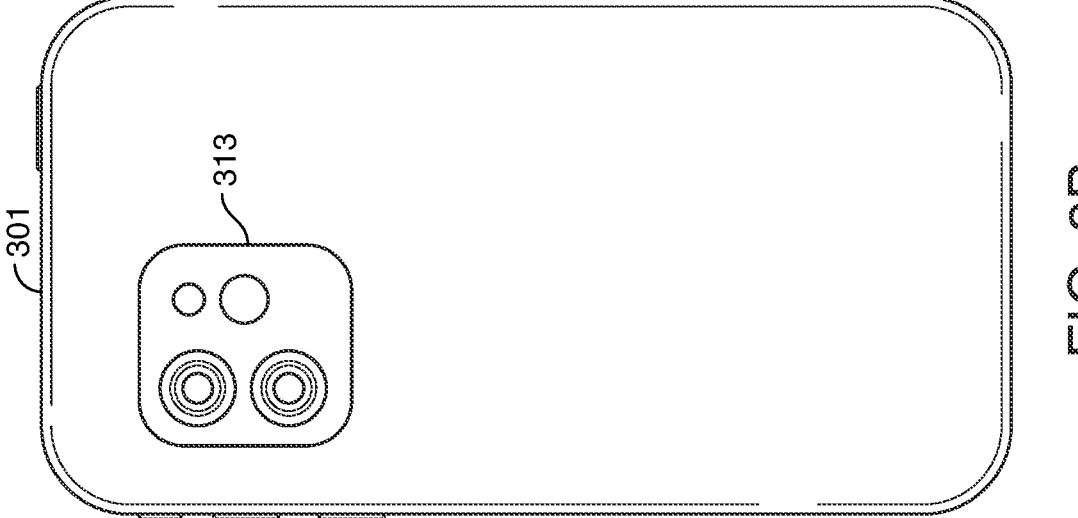
FIG. 3B shows an illustrative apparatus in accordance with principles of the disclosure.
Figure 3A:
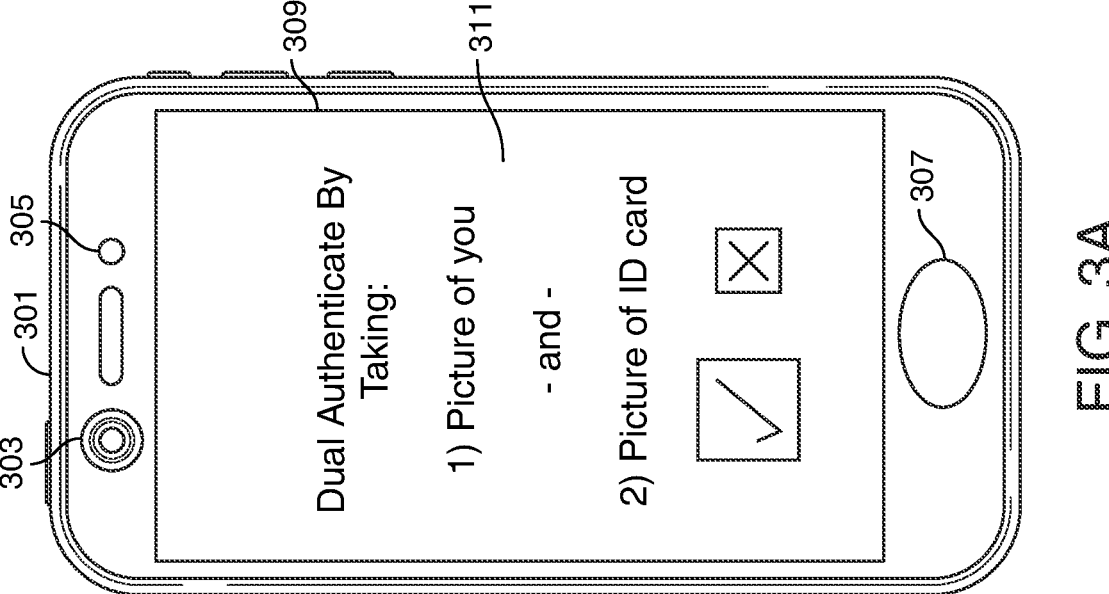
FIG. 3A shows an illustrative apparatus in accordance with principles of the disclosure.

FIG. 3A shows an illustrative apparatus in accordance with principles of the disclosure. FIG. 3A shows one side of mobile device 301. This side of device 301 may be referred to as the front.

Mobile device 301 may include a camera 303. Device 301 may include a microphone 305. Device 301 may include a fingerprint scanner 307. Camera 303, microphone 305, and fingerprint scanner 307 may all be orientated to face the same or similar direction.

Camera 303, microphone 305, and fingerprint scanner 307 may all be varying types of authentication sensors. Other authentication sensors may be present as well.

Device 301 may include a screen 309. Instructions 311 for dual authentication may be displayed on screen 309.

Standard components of a mobile device 301, such as a processor, memory, communication links, etc., are not shown.

FIG. 3B shows an illustrative apparatus in accordance with principles of the disclosure. FIG. 3B shows one side of mobile device 301. This side of device 301 may be referred to as the back.

Mobile device 301 may include a camera 313. Camera 313 may include a flash, microphone, and one or more lenses.

Camera 313 may be orientated in a diametrically opposed direction as camera 303 in FIG. 3A.

Standard components of a mobile device 301, such as a processor, memory, communication links, etc., are not shown in FIG. 3B.

Figure 4:
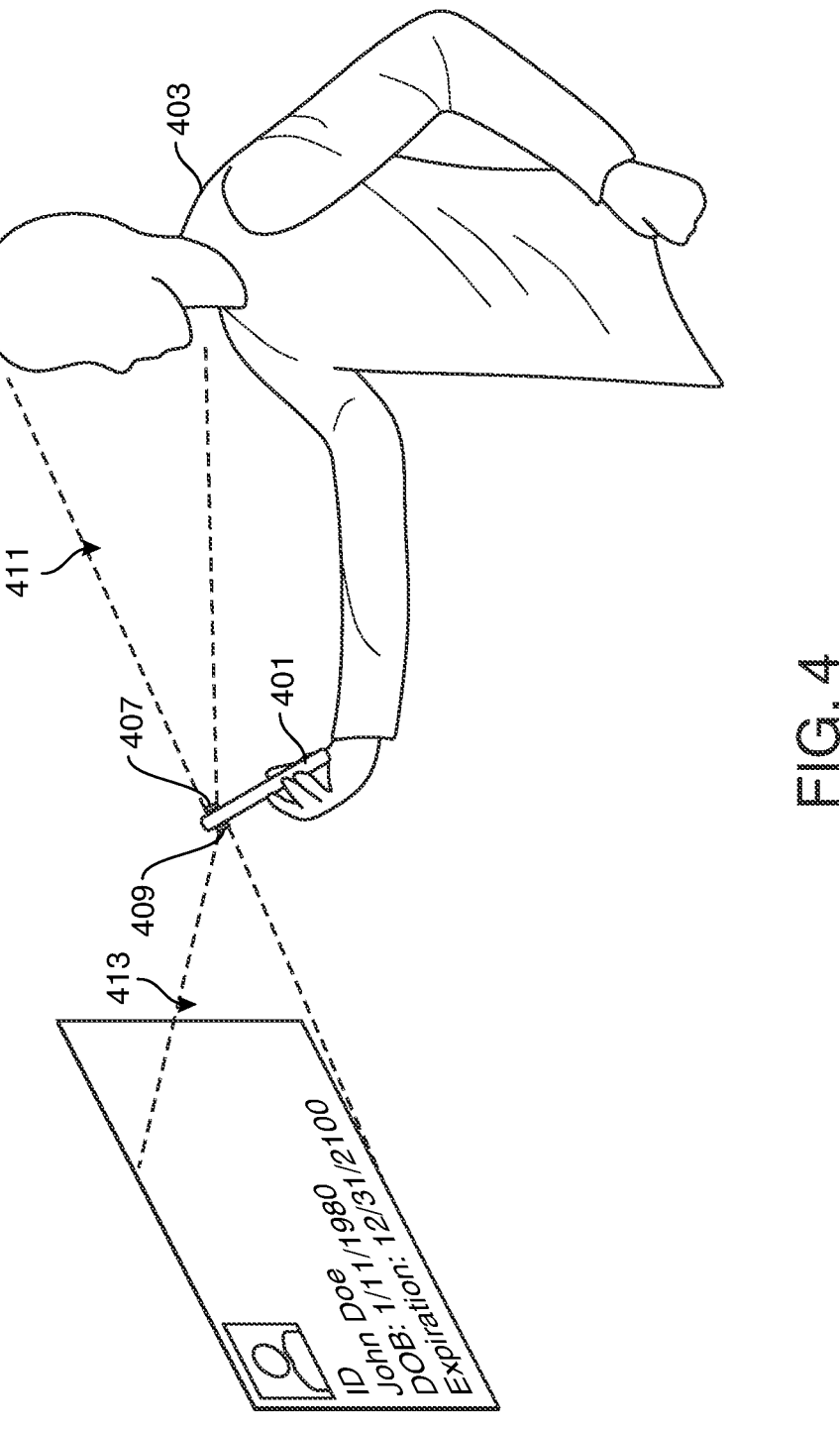
FIG. 4 shows an illustrative apparatus in accordance with principles of the disclosure.

FIG. 4 shows an illustrative apparatus in accordance with principles of the disclosure. A user 403 may use a mobile device 401 for dual authentication.

Mobile device 401 may include a first camera 407 and a second camera 409. Camera 407 and camera 409 may be orientated in different directions. The different directions may be diametrically opposed.

User 403 may take 411 a picture of the user with camera 407.

User 403 may take 413 a picture of an ID card 405 or other authentication or verification document with camera 409.

The picture of the user 403 and the picture of the ID card 405 may be taken simultaneously or within a short predetermined time period of each other. The pre-determined time period may be, for example, three seconds or five seconds. Longer time periods (such as ten seconds or more) may be ineffective for dual authentication as dual authentication may rely on authenticating a user with two or more sets of authentication information gathered at about the same time, to prevent malicious activity.

Figure 5:
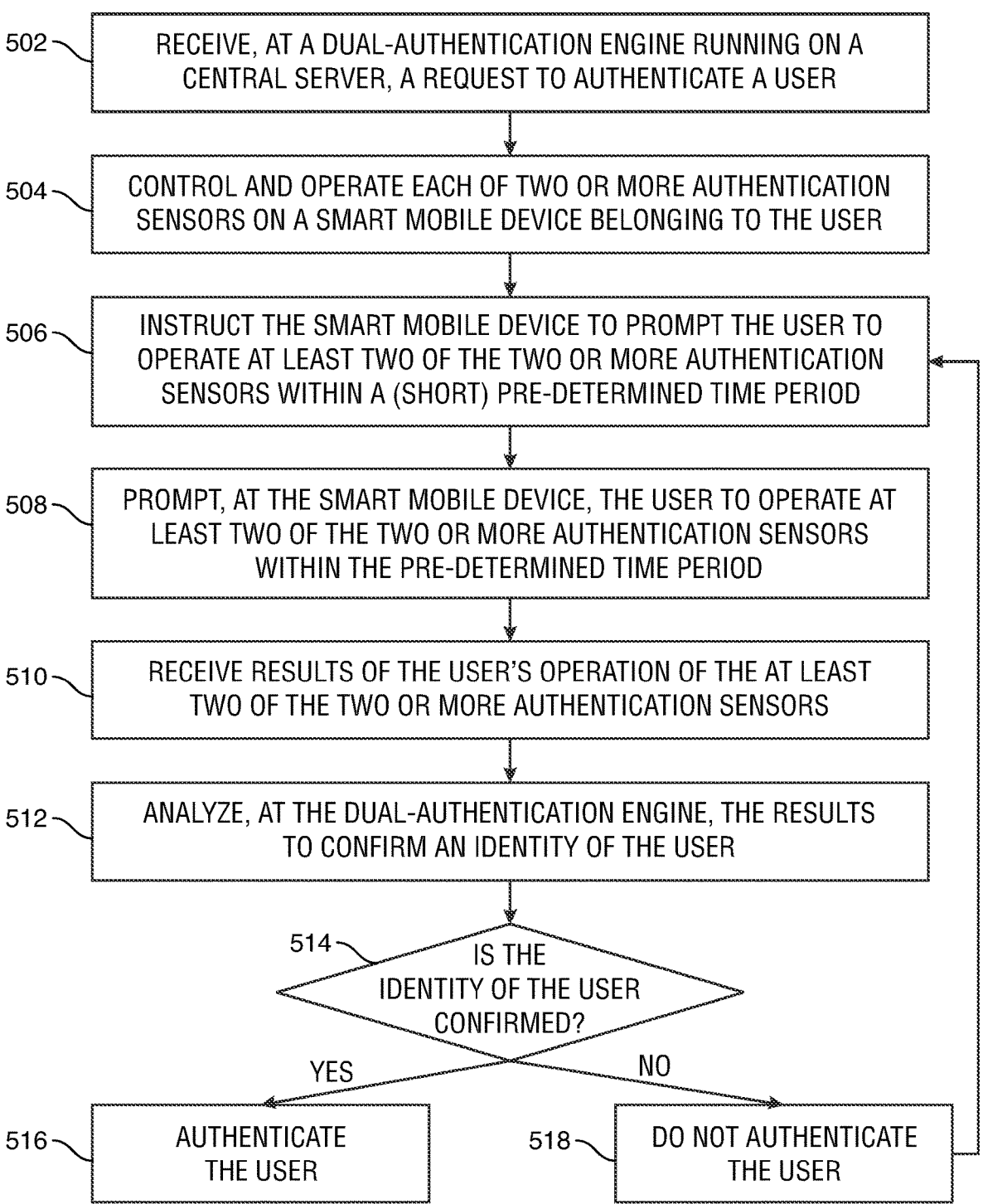
FIG. 5 shows an illustrative flowchart in accordance with principles of the disclosure.

FIG. 5 shows an illustrative flowchart in accordance with principles of the disclosure. Methods may include some or all of the method steps numbered 502 through 518. Methods may include the steps illustrated in FIG. 5 in an order different from the illustrated order. The illustrative method shown in FIG. 5 may include one or more steps performed in other figures or described herein. Steps 502 through 518 may be performed on the apparatus shown in FIGS. 1-4, or other apparatus.

At step 502, a dual authentication engine at a server, centralized or decentralized, may receive a request to authenticate a user. The request may come from a website, a device, a physical location, or a software application. The software application may be on the device. The dual authentication engine may be located on a server, which may be centralized or distributed in various embodiments.

At step 504, the authentication engine operate and control each of two or more authentication sensors on a smart mobile device belonging to the user. Authentication sensors may include cameras, biometric sensors, microphones, and other sensors.

In an embodiment, two of the two or more authentication sensors may be required to operate in a different matter than each other. For example, a mobile device may have two cameras (one forward facing and one rear facing), a microphone, and a fingerprint scanner. In an embodiment, the dual authentication engine may accept data from each camera, or the engine may require the user to use one camera and the microphone or fingerprint scanner, to provide various types of authentication data to analyze.

At step 506, the dual authentication engine may instruct the smart mobile device to prompt the user to operate at least two of authentication sensors within a pre-determined time period. The pre-determined time period may be short.

In an embodiment, the dual authentication engine may vary the pre-determined time period based on a variety of factors, including what (or why) the user is being authenticated for.

In an embodiment, the dual authentication engine may instruct a copy or version of the dual authentication engine that is present on the mobile device to prompt the user.

At step 508, the smart mobile device, or an application on the device, may prompt the user to operate at least two of the authentication sensors within the pre-determined time period.

In an embodiment, the user may be given two or more chances to use each authentication sensor within the time period. The number of chances may be varied by the dual authentication engine. In an embodiment, after a pre-determined number of failures to use two or more of the authentication sensors within the pre-determined time period, the user may be prevented (locked out) from completing the dual authentication process.

At step 510, the dual authentication engine may receive the results of the user's use of the two or more authentication sensors. The results may be digital data. The results may be photographs, sensor readings, voice recordings, and other authentication data.

At step 512, the dual authentication engine may analyze the results received at step 510 to determine if the user has provided enough data to authenticate the user or not. The dual authentication engine may compare the results received to existing authenticated data from the user. The existing authenticated data may be stored on a database. The database may be at the server or elsewhere. For example, the dual authentication engine may compare a voice recording received to a stored voice recording to determine if there is a match or not.

At step 514, the dual-authentication engine may determine if the identity of the user is confirmed or not through the analysis at step 512. If the identity of the user is confirmed, the dual authentication engine may authenticate the user at step 516.

If the identity of the user is not confirmed, the dual authentication engine may refuse to authenticate the user at step 518.

In an embodiment, the dual authentication engine may return the process to step 506 and again instruct the smart mobile device to prompt the user to use two or more of the authentication sensors.

Figure 6:
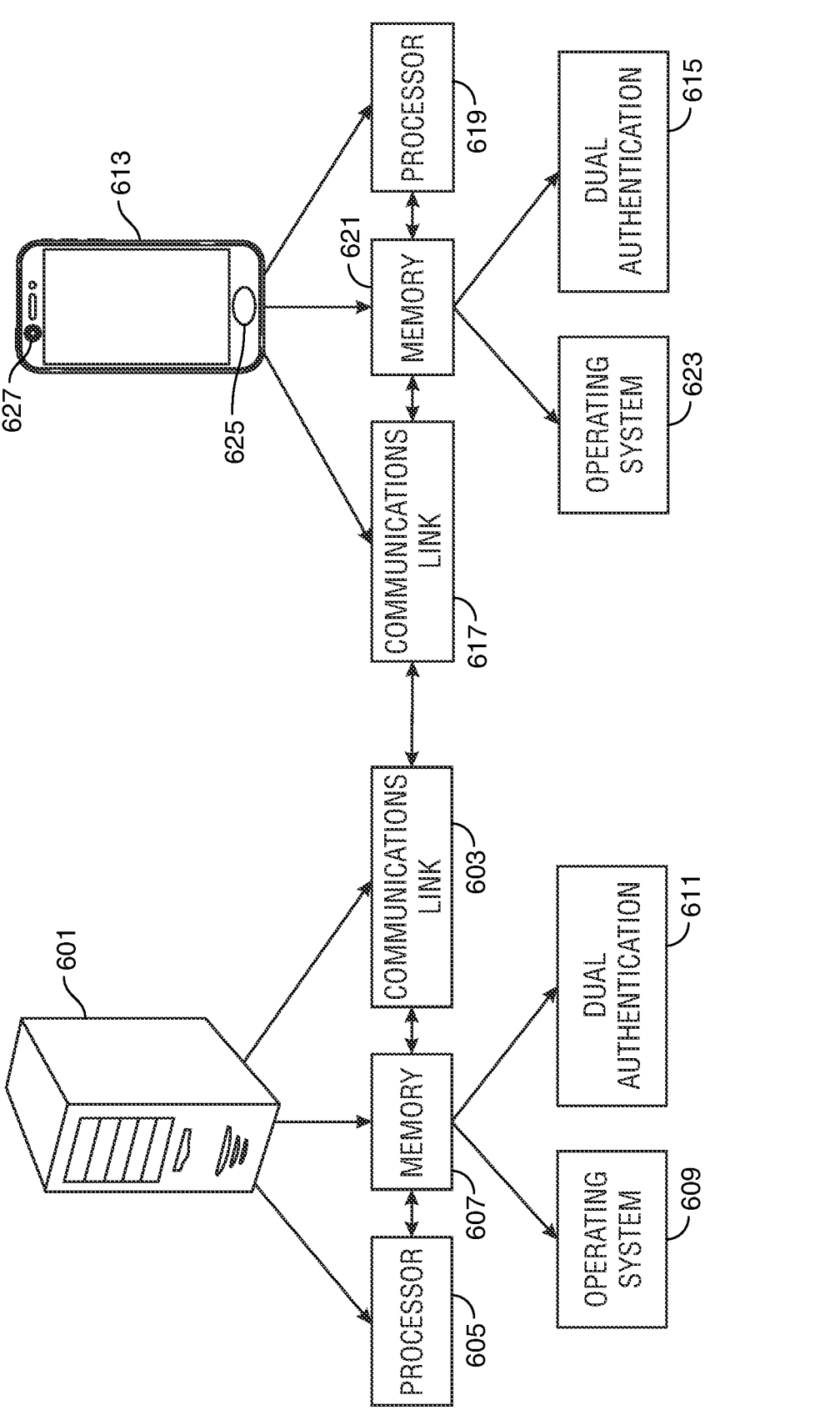
FIG. 6 shows an illustrative apparatus in accordance with principles of the disclosure.

FIG. 6 shows an illustrative apparatus in accordance with principles of the disclosure.

The apparatus may include a server/computer 601. Server 601 may include a server communication link 603, a server processor/processors 605, and a server non-transitory memory 607, as well as other components.

The apparatus may include a mobile device 613. Mobile device 613 may be a smart mobile device. Mobile device 613 may include a device communications link 617, a device processor or processors 619, and a device non-transitory memory 621.

The server non-transitory memory 607 may include an operating system 609, and a dual authentication engine 611, as well as other data and programs.

The communications link 603 may communicate with the mobile device 613 (as well as other devices/servers/computers, not shown).

The device non-transitory memory 621 may include an operating system 623, and a copy of the dual authentication engine 615.

Device 613 may include two or more authentication sensors, including fingerprint scanner 625 and camera 627.

The dual authentication engine application 611 or 615 may be configured to receive a request to authenticate the user from the mobile device 613. Dual authentication engine 611 or 615 may be configured to control each of the two or more authentication sensors 625 and 627 on device 613.

When the request to authenticate the user is received, the dual authentication engine application 611 or 615 may be configured to prompt the user to operate at least two of the two or more authentication sensors 625 and 627 within a pre-determined time period.

The dual authentication engine application 611 or 615 may be configured to receive results of the user's operation of the at least two of the two or more authentication sensors 625 and 627.

The dual authentication engine application 611 or 615 may be configured to analyze the results to confirm an identity of the user. When the dual-authentication engine 611 or 615 confirms the identity of the user, it may authenticate the user.

Thus, apparatus and methods for dual authentication with mobile device(s) are provided. Persons skilled in the art will appreciate that the present invention can be practiced by other than the described embodiments, which are presented for purposes of illustration rather than of limitation.

What is claimed is:

1. An apparatus for dual authentication, the apparatus comprising:

a smart mobile device comprising:
   one or more first direction-facing cameras;
   one or more second direction-facing cameras;
   a MAC address a communication link;
   a processor; and
   a non-transitory memory configured to store at least:
      an operating system; and
      a dual-authentication engine that runs on the processor;
wherein the dual-authentication engine is configured to:
   receive a request to authenticate a user;
   operate the one or more first direction-facing cameras; and operate the one or more second direction-facing cameras; and when the dual-authentication engine receives the request to authenticate the user, the dual-authentication engine:

requests the user use one or more of the one or more first direction-facing cameras and simultaneously use one or more of the one or more second direction-facing cameras;

receives one or more first pictures taken by the one or more of the one or more first direction-facing cameras and one or more second pictures taken by the one or more of the one or more second direction-facing cameras, wherein the one or more second pictures are of a document with a current and verifiable date;

analyzes every received picture; and when every received picture and the MAC address satisfy one or more authentication criteria, the dual-authentication engine authenticates the user.

2. The apparatus of claim 1 wherein the smart mobile device is a smartwatch.

3. The apparatus of claim 1 wherein the smart mobile device is a smartphone.

4. The apparatus of claim 1 wherein the first direction and the second direction are diametrically opposed.

5. The apparatus of claim 1 wherein the smart mobile device includes a biometric scanner.

6. The apparatus of claim 1 wherein the first direction and the second direction are different.

7. The apparatus of claim 1 wherein the one or more first pictures are of the user.

8. The apparatus of claim 1 wherein the one or more second pictures are of an identification card.

9. An apparatus for dual-authentication, the apparatus comprising:

a central server, the central server comprising:

a server communication link;

a processor; and a non-transitory memory configured to store at least:

an operating system; and a dual-authentication engine that runs on the processor; and a smart mobile device belonging to a user, the smart mobile device comprising:

a device communication link;

a MAC address; wherein the MAC address is encrypted and associated with the user; and two or more authentication sensors;

wherein the dual-authentication engine is configured to:

receive a request to authenticate the user from the smart mobile device;

control each of the two or more authentication sensors; and when the request to authenticate the user is received:

prompt the user to operate at least two of the two or more authentication sensors simultaneously;

receive results of the user's operation of the at least two of the two or more authentication sensors, wherein at least one of the results comprises a picture of a document with a current and verifiable date;

receive the encrypted MAC address;

analyze the results and the encrypted MAC address to confirm an identity of the user; and when the dual-authentication engine confirms the identity of the user, authenticate the user.

10. The apparatus of claim 9 wherein two of the two or more authentication sensors are cameras.

11. The apparatus of claim 9 wherein one of the two or more authentication sensors is a biometric sensor.

12. The apparatus of claim 9 wherein one of the two or more authentication sensors is a microphone.

13. The apparatus of claim 9 wherein at least one of the two or more authentication sensors operates distinctly from a second authentication sensor.

14. The apparatus of claim 13 wherein the dual-authentication engine is configured to prompt the user to operate at least two separate authentication sensors that operate distinctly from each other.

15. A method for dual authentication with a smart mobile device belonging to a user, the method comprising:

receiving, at a dual-authentication engine running on a central server, a request to authenticate the user;

controlling each of two or more authentication sensors on a smart mobile device belonging to the user;

instructing the smart mobile device to prompt the user to operate at least two of the two or more authentication sensors simultaneously;

prompting, at the smart mobile device, the user to operate at least two of the two or more authentication sensors within the pre-determined time period;

receiving results of the user's operation of the at least two of the two or more authentication sensors wherein at least one of the results comprises a picture of a document with a current and verifiable date;

receiving an encrypted unique serial code of the smart mobile device from the smart mobile device;

analyzing, at the dual-authentication engine, the results and the unique serial code to confirm an identity of the user; and when the dual-authentication engine confirms the identity of the user, authenticating the user.

16. The method of claim 15 wherein the dual-authentication engine analyzes the results through an application of one or more artificial intelligence/machine learning ("AI/ML") algorithms.

17. The method of claim 15 wherein the results include a photograph of the user.

18. The method of claim 15 wherein the results include a photograph of an identification card belonging to the user.

* * * * *